United States Patent Office 3,005,803
Patented Oct. 24, 1961

3,005,803
THIOETHER CONDENSATION PRODUCT AND PROCESS
Hans Holtschmidt, Koln-Stammheim, and Otto Bayer, Erwin Müller, and Günther Nischk, Leverkusen, Germany, assignors, by direct and mesne assignments, of one-half to Farbenfabriken Bayer Aktiengesellschaft, Leverkusen, Germany, a corporation of Germany, and Mobay Chemical Company, Pittsburgh, Pa., a corporation of Delaware
No Drawing. Filed Jan. 23, 1957, Ser. No. 635,595
Claims priority, application Germany Jan. 26, 1956
8 Claims. (Cl. 260—79)

This invention relates generally to a method for making thioethers and more particularly to a method for making high molecular weight polythioethers without unreacted monomers undergoing ring closure reactions.

It has been proposed heretofore to prepare thioethers of relatively high molecular weight by heating a polyhydric alcohol and preferably a dihydric alcohol with a thioether glycol in the presence of a catalyst which causes splitting off of water. Products of such a reaction often have a molecular weight of about 400 to 800 and are useful as plasticizers and as lubricating oils. In some instances, the condensation has been continued until compounds of molecular weight of up to about 10,000 have been obtained, but these products have always contained compounds which impart an undesirable odor to the rather viscous or solid condensation product. This undesirable odor is caused by the presence of low molecular ethers and even monomers that tend to undergo ring closure reactions during the condensation process. For example, in the acid condensation of thiodiglycol, 1,4-thioxane is formed by the splitting off of water intramolecularly and 1,4-dithiane is frequently formed by the splitting off of 2 mols of water and 2 mols of ethylene oxide from 2 mols of thiodiglycol. These compounds impart an undesirable odor to the condensation product. Special purification processes are required to remove them as simple distillation processes are inadequate. Usually, the amount of these ring compounds formed increases as the amount of thioether glycol decreases during the condensation process.

The polyhydric alcohols, and particularly the glycols, which do not contain a sulfur atom also have a tendency to form low molecular linear or cyclic ethers by splitting off water. For example, ethylene glycol forms diethylene glycol and tetrahydrofuran is frequently formed if butanediol-1,4 is used as the polyhydric alcohol component. These intramolecular reactions of the polyhydric alcohols may be avoided at least to some extent by using a long-chain glycol, such as, for example, heptamethylene glycol, but such compounds are not readily available.

As disclosed in U.S. Patent 2,518,245, it is possible to use polyalkylene oxides such as, for example, triethylene glycol or tetraethylene glycol in the condensation process with a thioether glycol in the production of lubricating oils, but these compounds cannot be utilized to advantage in the manufacture of plastics because the resulting compounds contain a large number of ether-oxygen atoms and have the undesirable characteristic of being more hydrophilic than a similar compound in which only sulfur atoms are present as hetero atoms or oxygen-ether atoms occur only infrequently in the carbon chain.

It is therefore an object of this invention to provide an improved method for making polythioethers of relatively high molecular weight. Another object of the invention is to provide a method for making polythioether condensation products suitable for use in making plastics which are substantially devoid of the products of a ring closure reaction. Still another object of the invention is to provide polythioethers of a molecular weight between about 800 and about 10,000 substantially devoid of undesirable-smelling compounds. A still further object is to provide a method for making high molecular weight hydroxy polythioethers substantially free from undesirable odors without the necessity of using complicated purification processes.

In accordance with this invention, the foregoing objects and others that will become apparent from the following description are accomplished by providing a process for making polythioethers of high molecular weight by reacting a bis-hydroxy alkyl sulfide with a glycol having at least three carbon atoms which has been hydroxyalkylated once or twice. The polyhydroxy compound and the bis-hydroxy alkyl sulfide are preferably reacted together in an approximately 1:1 molar ratio by heating to a temperature of about 100° C. or higher and preferably to a temperature within the range of from about 150° C. to about 200° C. A suitable etherification catalyst is used in the process. In some instances, it is advisable to conduct at least the last stages of the condensation process under reduced pressure.

By bis-hydroxy alkyl sulfide as used herein and in the claims is meant a thioether glycol which has only alkyl groups between the hydroxyl groups and sulfur atom. Such a compound would have the general formula $$[HO—R'—]_2S$$

wherein $R'$ is an alkylene radical.

The thioether glycol may be either a mixed ether or a symmetrical compound. Any suitable thioether glycol having a formula of this nature may be utilized, including, for example, thiodiglycol, 1,7-dihydroxy-4-thiaheptane, $\beta,\beta'$-dihydroxydipropyl sulfide, $\alpha,\alpha'$-dihydroxydipropyl sulfide, 1,6-dihydroxy-2-thiahexane. Further examples are the compounds of the following formulae:

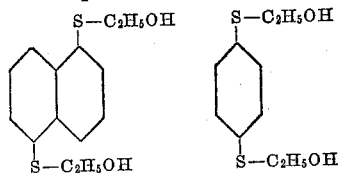

Any glycol produced by alkylating once or twice a glycol having at least three carbon atoms may be utilized. Such glycols have the formula $$HOR'—O—(R''—O—)_nR'OH$$

wherein $R'$ is an alkylene radical, $R''$ is a divalent organic radical of at least three carbon atoms, either arylene or aliphatic, and $n$ is 0 or 1. If $n=0$, at least one $R'$ must contain at least three carbon atoms. Preferred examples of such compounds include:

(1) 1,10-dihydroxy-4,8-dioxadecane, $$HO—(CH_2)_2O(CH_2)_4O(CH_2)_2—OH$$

(2) 1,7-dihydroxy-3-oxaheptane, $$HO—(CH_2)_2O(CH_2)_4—OH$$

(3) 1,6-dihydroxy-2-dimethyl-4-oxahexane,

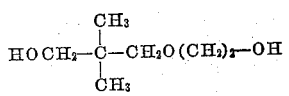

(4) 1,9-dihydroxy-5-dimethyl-3,6-dioxanonane,

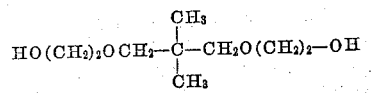

(5) 1,8-dihydroxy-4-methyl-3,6-dioxaoctane,

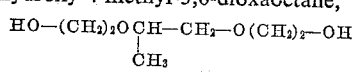

(6) 1,6-dihydroxy-4-methyl-3-oxahexane,

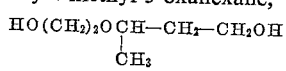

(7) 2,8-dihydroxy-oxaoctane,

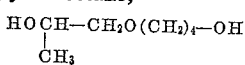

(8) di(α-hydroxyethoxy)benzene,

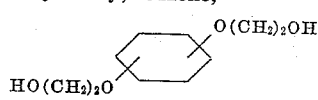

(9) bis(α-hydroxyethoxyphenyl)methane,

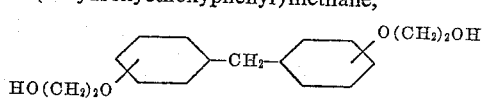

(10) bis(α-hydroxyethoxyphenyl)dimethylmethane, or 4,4'-bis-hydroxyethyl diphenyl dimethylmethane,

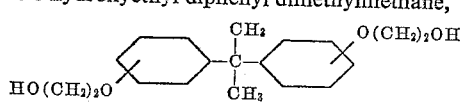

(11) di(α-hydroxyethoxy)diphenyl,

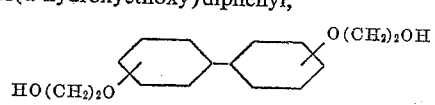

(12) di(α-hydroxyethoxy)naphthalene,

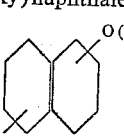

(13) bis(dihydroxyethoxy)phenyloxide,

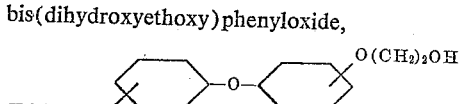

The aromatic rings of these compounds may also carry alkyl groups, halogen atoms or alkoxy groups. These compounds, however, must not contain either a nitro group or a nitrile group.

Any suitable etherification catalyst may be utilized and it is preferably used in small amounts of from about 0.01 to about 0.5 percent by weight. Usually the dehydration is complete after about 6 to 12 hours of heating at temperatures of above 100° C. and preferably within the range of 150° C. to 200° C., but the time of heating may vary somewhat with the amount of catalyst utilized. Evacuation of the vessel in which the condensation process is being conducted towards the end of the reaction insures the removal of the last traces of water from the reaction. Examples of suitable catalysts are aromatic sulfonic acids, esters of aromatic sulfonic acids, sulfuric acid and amidosulfonic acids.

The increase in molecular weight of the condensation product can be followed by determining the hydroxyl number of the melt as the condensation process progresses. A molecular weight of from about 800 to about 10,000 is preferred. The product has terminal hydroxyl groups and units of the configuration

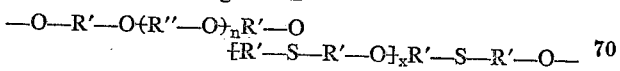

wherein $n$ is either 0 or 1, R' is an alkylene radical and when $n=0$, R' is an alkylene radical containing at least three carbon atoms, —R'' is a divalent organic radical containing at least three carbon atoms, and $x$ is 0 or an integer.

Polythioethers with varying degrees of branching may be obtained by adding a trihydric alcohol or other polyhydric alcohol having more than two hydroxyl groups to the reaction mixture. Usually such polyhydric alcohols are utilized in relatively low proportions unless a large amount of branching of the chain is desired. The invention also contemplates a process in which linear or branched polyesters containing hydroxyl groups and having a molecular weight of approximately 500 to 6,000 are used in addition to the hydroxyalkylated glycols to form the condensation product. In this process, however, it is preferred to heat the mixture of the glycol and the bishydroxyalkyl sulfide until a condensation product having a molecular weight of about 400 or more is obtained before adding the polyester to the reaction mixture. It has been found that if this precaution is taken the polyester will mix with the polyether, whereas a polyester and polyether of less than 400 molecular weight are not usually miscible with each other.

It has been found that the process provided by this invention results in a yield substantially equivalent to the calculated quantitative yield. The resulting products have the desirable high molecular weight of up to 10,000 or more and the spontaneous condensation of the sulfur-containing component which is always to be feared in the prior art processes is nil or insignificantly small. Because of the nature of the glycol component, that is, the hydroxyalkylated glycol not containing the sulfur atom in the carbon chain, the polycondensates obtained from this process are liquid at room temperature and are therefore admirably suitable for use in further chemical reactions to produce solid plastic materials. The joint condensation of an hydroxyalkylated glycol and a bis-hydroxyalkyl sulfide with an hydroxyl polyester is particularly important in the production of water repellent polyethers for use in the plastics industry.

The polythioether provided by this invention may be reacted with a polyisocyanate to form a polyurethane plastic having more pronounced hydrophobic properties. The polyurethane may be a cellular product useful for making cushions, carpet underlay and many other articles or it may be a homogeneous rubber-like material suitable for making machine parts, tires for vehicles and many other products.

*Example 1*

About 1220 grams of thiodiglycol and about 1780 grams of 1,4-butylene-bis-hydroxyethyl glycol which has been prepared from 1,4-butylene glycol by hydroxyethylation at about 120–130° C., in the presence of a small proportion of sodium, until the theoretical increase in weight is attained are heated while stirring in a carbon dioxide atmosphere after the addition of about 12 grams of p-toluene sulfonic acid monohydrate. A reaction in which water is violently split off is initiated at a temperature of about 150–160° C. After about 6 hours, a water-jet vacuum is applied and the condensation is continued at about 160° C. until an OH number of about 100 is reached. A yellowish-brown oil is obtained in a yield of about 97% of the theoretical, this oil being insoluble in water. No formation of tetrahydrofuran is observed during the condensation.

*Example 2*

About 1220 grams of thiodiglycol and about 1480 grams of pentaglycol monohydroxyethyl ether

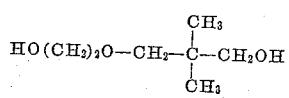

are condensed as described in Example 1 with the addition of about 0.3% of p-toluene sulfonic acid until an OH number of about 95 is reached. The yield is about 96% of the theoretical.

Example 3

About 1220 grams of thiodiglycol and about 3160 grams of 4,4'-bis-hydroxyethyl diphenyl dimethylmethane

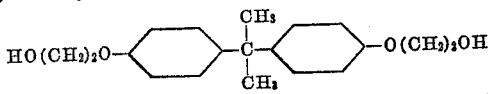

are condensed as described in Example 1 with the addition of about 0.2% of p-toluene sulfonic acid. The splitting off of water begins at about 140° C. and is complete after about 4 hours. The product is condensed until an OH number of about 80 is reached. It is a very viscous light yellow resin in the cold state. The yield is about 98% of the theoretical.

Example 4

About 1220 grams of thiodiglycol, about 1580 grams of 4,4'-bis-hydroxyethyl diphenylmethane, about 712 grams of 1,4-butylene-bis-hydroxyethyl glycol and about 134 grams of trimethylolpropane are condensed as described in Example 1 with the addition of about 0.3% of p-toluene sulfonic acid until an OH number of about 180 is reached. The resulting branched polycondensation product is light yellow in color. The yield is about 96% of the theoretical.

Although the invention has been described in considerable detail in the foregoing for the purpose of illustration, it is to be understood that such detail is solely for the purpose of illustration and that variations can be made by those skilled in the art without departing from the spirit and scope of the invention except as it may be set forth in the claims.

What is claimed is:

1. A method for making a polythioether comprising reacting as the sole reaction ingredients thiodiglycol and 1,4-butylene-bis-hydroxyethyl glycol in the presence of p-toluene sulfonic acid to temperatures of about 150° C. to about 160° C. until the OH number is about 100.

2. The condensation product of a dihydroxy thioether and an ether glycol containing not more than two ether oxygen atoms and containing a divalent radical of at least three carbon atoms.

3. The product of claim 2 wherein said ether glycol is 1,10-dihydroxy-4,8-dioxadecane.

4. The product of claim 2 wherein said ether glycol is pentaglycol monohydroxyethyl ether.

5. The product of claim 2 wherein the dihydroxy thioether is thiodiglycol and the ether glycol is 4,4'-bis-hydroxyethyl diphenyl dimethylmethane.

6. A process for making a polythioether which comprises heating to a temperature of at least about 100° C. a mixture containing as the sole reaction ingredients (a) a thioether glycol in which the —OH groups are on terminal carbon atoms and having each hydroxyl group separated from a thioether sulfur atom only by an alkylene radical with (b) a glycol having the formula $$HO-R'-O-(R''-O-)_n R'OH$$

wherein $R'$ is alkylene, $R''$ is a member selected from the group consisting of alkylene and arylene and $n$ is a member selected from the group consisting of 0 and 1, with the proviso that (b) must contain a chain of at least three carbon atoms, until condensation to form a polythioether having a molecular weight of at least about 800.

7. The product of the process of claim 6.

8. The process of claim 6 wherein the molar ratio of (a) to (b) is about 1:1.

References Cited in the file of this patent
UNITED STATES PATENTS

| | | |
|---|---|---|
| 2,518,245 | Morris | Aug. 8, 1950 |
| 2,844,566 | Schwarz et al. | July 22, 1958 |
| 2,886,555 | Bunge et al. | May 12, 1959 |